US007966203B1

(12) United States Patent
Pietrzak

(10) Patent No.: US 7,966,203 B1
(45) Date of Patent: Jun. 21, 2011

(54) PROPERTY INSURANCE RISK ASSESSMENT USING APPLICATION DATA

(75) Inventor: Steven Pietrzak, South Barrington, IL (US)

(73) Assignee: Millennium Information Services, Itasca, IL (US)

( * ) Notice: Subject to any disclaimer, the term of this patent is extended or adjusted under 35 U.S.C. 154(b) by 186 days.

(21) Appl. No.: 12/394,777

(22) Filed: Feb. 27, 2009

(51) Int. Cl.
*G06Q 40/00* (2006.01)
(52) U.S. Cl. .............................. 705/4; 705/35
(58) Field of Classification Search .................. 705/4, 35
See application file for complete search history.

(56) References Cited

U.S. PATENT DOCUMENTS

| | | | |
|---|---|---|---|
| 4,831,526 A | 5/1989 | Luchs et al. | |
| 6,192,347 B1 * | 2/2001 | Graff | 705/36 R |
| 7,319,970 B1 | 1/2008 | Simone | |
| 2003/0023462 A1 * | 1/2003 | Heilizer | 705/4 |
| 2003/0040934 A1 | 2/2003 | Skidmore et al. | |
| 2004/0024619 A1 | 2/2004 | DiBella | |
| 2004/0153330 A1 * | 8/2004 | Miller et al. | 705/1 |
| 2005/0096944 A1 * | 5/2005 | Ryan | 705/4 |
| 2005/0209897 A1 * | 9/2005 | Luhr | 705/7 |
| 2006/0136330 A1 * | 6/2006 | DeRoy et al. | 705/38 |
| 2006/0143054 A1 * | 6/2006 | Taylor | 705/4 |
| 2006/0184440 A1 * | 8/2006 | Britti et al. | 705/35 |
| 2007/0088507 A1 * | 4/2007 | Haberlen et al. | 702/19 |
| 2007/0260401 A1 * | 11/2007 | Sydor et al. | 702/1 |
| 2009/0132299 A1 * | 5/2009 | Patton | 705/4 |
| 2009/0177500 A1 * | 7/2009 | Swahn | 705/4 |
| 2010/0063851 A1 * | 3/2010 | Andrist et al. | 705/4 |
| 2010/0114593 A1 * | 5/2010 | Sarel et al. | 705/2 |
| 2010/0114634 A1 * | 5/2010 | Christiansen et al. | 705/7 |
| 2010/0145734 A1 * | 6/2010 | Becerra et al. | 705/4 |
| 2010/0198630 A1 * | 8/2010 | Page et al. | 705/7 |
| 2010/0241556 A1 * | 9/2010 | Reinheimer et al. | 705/38 |

OTHER PUBLICATIONS

"Introducing Millennium's Automated Property System (MAPS™)," Millennium Information Services, Inc., 1995.
"Millennium's Automated Property System (MAPS™)," Millennium Information Services, Inc., 1998.
"Millennium's Automated Property System—e-MAPS™," Millennium Information Services, Inc., 2001.
"ITV—Boeckh and Millennium—Providing Successful Insurance-To-Value Solutions," Millennium Information Services, Inc., 1998.
"Boeckh and Millennium—Providing Successful Insurance-To-Value Solutions," Millennium Information Services, Inc., 1999.
U.S. Appl. No. 11/287,649, filed Nov. 28, 2005.
Office Action for U.S. Appl. No. 11/287,649, dated Apr. 1, 2009.
Final Office Action for U.S. Appl. No. 11/287,649, dated Nov. 12, 2009.
Office Action for U.S. Appl. No. 11/287,649, dated Jun. 24, 2010.
Final Office Action for U.S. Appl. No. 11/287,649, dated Oct. 29, 2010.

* cited by examiner

*Primary Examiner* — Narayanswamy Subramanian
(74) *Attorney, Agent, or Firm* — Marshall, Gerstein & Borun LLP

(57) ABSTRACT

A pre-screening or application risk assessment score may be calculated based on data accumulated during an insurance application process to more effectively segment risks at the point of application. The application data may be used as a substitute for, or in addition to, the applicant's credit score as an accurate measure of risk on the policy. In general, this pre-screening risk assessment score may be particularly useful for segmenting risks during the application and underwriting process for insurance policies that typically require a measurement of risks contributed by both the property and the applicant before the policy is written. More specifically, the score may be used during the underwriting process for property insurance policies. In accordance with one aspect of the disclosure, a method is useful for segmenting risks associated with an insurance coverage determination for property that typically requires a physical inspection, for example, real property.

9 Claims, 5 Drawing Sheets

| Client Access |
|---|
| Search |
| Submit Orders |
| Administration |
| Reports |
| Policy Status |
| QV Throughput |
| Vendor Time Service |
| Time Service |
| Vendor Info |
| Insp Order Diff |
| Dup Check |
| Load Count |
| Rejection Tracking |
| Worked Deletions |
| Intranet |
| Order Edit |
| Person Setup |
| Person Search |
| Special Instructions |
| Insert Photo |
| Copy Photo |
| Agent Search |
| Add agent |
| Administration |
| UDL Change |
| Add User |
| Vendor Assignment |
| Log Off |

SEARCH

Inspection Status
Currently showing Page 1 of 1
12 record(s) found

| | Download As CSV | Download As XLS | | Request Vendor Status | | | Cancel Orders | | | Assign Inspection(s) | | | Send Inspection(s) | |
|---|---|---|---|---|---|---|---|---|---|---|---|---|---|---|
| | Policy Number | Insured Name | Address | State | Vendor ID | Order Date | Srvy Date | Insp Receive Date | Comp Date | Cov A | Repl Cost | Variance | Variance % | Stack Order | Stack Order 2 | Agent ID | Worked By |
| ☐ | RC1234 | KRISTIE STROMG | 123 Aster dr. N. Glen | MD | VPFRO | 4/15/05 | 4/22/05 | 10/02/05 | 10/03/05 | $150,000 | $152,882 | $2,882 | 1.9 | C | - | 410726 | |
| ☐ | RC0123 | MARIAL RINCK | 12 Maine st. Baltimore | MD | VPFRO | 4/19/05 | 9/26/05 | 10/04/05 | 10/05/05 | $250,000 | $281,144 | $31,144 | 12.5 | C | - | 410298 | |
| ☐ | RC0012 | GARY TARAN | 101 Steeple Run Littleton | CO | Millennium | 7/11/05 | 10/15/05 | 10/18/05 | 10/19/05 | $255,000 | $266,921 | $11,921 | 4.7 | C | - | 410493 | |
| ☐ | RC0001 | ERIC M HINCHLIF | 456 Wanela Lake rd. Dundee | NY | Millennium | 7/13/05 | - | 10/13/05 | 10/13/05 | $187,000 | - | - | - | - | - | 295464 | |
| ☐ | RC1111 | DAN DANIEL | 222 NE 19th Court Woodinville | WA | Allied | 7/14/05 | 9/27/05 | 10/05/05 | 10/06/05 | $459,000 | $367,412 | ($91,588) | (20) | A | - | 530350 | |
| ☐ | RC2222 | MICHAEL BAKER | 333 Beaver Lake dr. Texarkana | TX | Millennium | 7/19/05 | 9/30/05 | 10/07/05 | 10/08/05 | $160,000 | $171,580 | $11,580 | 7.2 | B | - | 418389 | |
| | Download As CSV | Download As XLS | | Request Vendor Status | | | Cancel Orders | | | Assign Inspection(s) | | | Send Inspection(s) | |

12 record(s) found

Sort listing by: Sort By: [v] ○ Ascending ⦿ Descending
And then by: Sort By: [v] ○ Ascending ⦿ Descending
And then by: Sort By: [v] ○ Ascending ⦿ Descending

[Sort Records] [Select All]

FIG. 3

Exemplary Automated Property Report

Policy Information

Policy xxxxxxx
Insured xxxxxxxxxxxxxxx
Mail xxxxxxxxxxxxxxx
Addr xxxxxxxxxxxxxxx Acount ID xxxxxxxxxx
Agent ID xxxxxxxxxx
Agent xxxxxxxxxx Legal xxxxxxxxxxxxxxx
Addr xxxxxxxxxxxxxxx
Type xxxxxxxxxxxxxxx    Construction FRAME    Coverage A $169,000    Year Built 1979
Eff. Date 08/15/2005

SURVEY DATE: 09/09/2005

| TOTAL LIVING AREA: | 1571 |
|---|---|
| YEAR BUILT: | 1979 |
| CONSTRUCTION TYPE | |
| BRICK-SOLD | 100% |
| STORIES   MAIN | 1 |
| WING 1 | |
| WING 2 | |

| | |
|---|---|
| SUB TOTAL | $169,794.00 |
| GENERAL CONSTRACTOR'S OVERHEAD | $0.00 |
| GENERAL CONSTRACTOR'S PROFIT | $0.00 |
| ARCHITECT FEES | $0.00 |
| DEBRIS REMOVAL COST | $0.00 |
| RCT INSURABLE REPLACEMENT COST | $169,794.00 |
| DETACHED STRUCTURE COST | $0.00 |
| DETACHED STRUCTURE DEPRECIATED CO | $0.00 |
| DETACHED STRUCTURE TOTALCOST | $0.00 |

STACK: C

Risc Score Calculation

SCORE: 195
  Number of Minor/Major Conditions
  Replacement Cost Value
  Garage Type
  Percent of Basement Finished

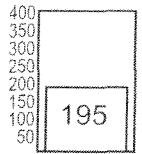

Underwriting Referrals
Major Other House External Condition
Major Shed Siding
Major Yard Appliances

Comments

FIG. 5

PROPERTY INSURANCE RISK ASSESSMENT USING APPLICATION DATA

BACKGROUND OF THE DISCLOSURE

1. Field of the Disclosure

The disclosure relates generally to the processing of data related to the subject of an insurance policy and, more particularly, to a system and method for segmenting risks at the point of application for insurance by calculating a pre-screening risk assessment score based on data received during an application process.

2. Brief Description of Related Technology

Applications for insurance, particularly for policies covering high-value items such as homes and other improvements to real property, typically require an assessment of risk to determine policy coverage limits of the insurer and payment rates for that coverage to be made by the prospective insured (i.e., the applicant). This risk assessment, or underwriting process, normally addresses a combination of significant sources of risk, for example, the risk that can be attributed to the property itself, and the risk that can be attributed to past behavior or other characteristics of the applicant. A physical inspection of the property often provides the measurement of risk contributed by the property itself, while an applicant's credit score often provides the measurement of risk that is likely to be contributed by the applicant.

Inspection reports have long provided valuable information in the underwriting decision-making process. Typically, a formal application process initiates the need for an inspection of the item or property to be insured. In the past, the application may have included requests for basic contact information and rudimentary details of the dwelling to determine if the property and applicant should be contacted for further detailed information or to schedule a physical property inspection. For particularly valuable items, such as a house or other real property, this inspection is typically conducted by a trained professional who travels to the property and conducts the inspection. Property inspections are typically performed by insurance agents or other designated individuals deployed in the field. Details that are physically collected about the property (e.g., the dwelling) are recorded on hardcopy or electronic forms designed to capture data related to a number of predetermined property characteristics. For instance, the inspector may utilize a number of checkboxes or placeholders on the form to identify attributes of the dwelling, such as the type of roof and siding.

Insurers have often outsourced the process of obtaining property inspections. For example, a commercially available service provided by the assignee of the present application (under the trademarks WIDE and MAPS) routes orders for property inspections in an automated fashion to an appropriate individual (e.g., a local inspector) in the field. An inspection report is then generated in an automated fashion for electronic delivery to the insurer requesting the inspection. The service thus facilitates the front end data gathering tasks, leaving most, if not all, of the analysis of the inspection data and information for the insurer. That is, such services generally did not directly assist the insurer in the processing of the inspection data and information.

One exception involves a replacement cost calculation that provides an estimated cost of rebuilding any structure in the event of a total loss of property. Replacement cost calculators, or calculation services, utilize one of many industry standard models, and are available from a number of providers, including Marshall & Swift, XactValue, and e2Value. In some cases, the cost estimate is provided to the insurer with the other inspection data and information. The calculation relies on certain data or information collected via the inspection. In any event, the manner in which the input data is provided to the calculator and the manner in which the resulting cost estimate are communicated have been automated by, or within, the above-described property inspection services. For example, the calculated estimate has been displayed as part of an inspection report provided to the insurer. The insurer then compares the estimate with a coverage level of the application or current policy to determine whether an underwriting referral should be generated. In some cases, the comparison has been conducted as part of the above-described property inspection services.

More recently, additional capabilities have been added to the inspection data collection process to assist the insurer in other ways. For example, functionality has been developed to provide convenient access to the inspection information and data. Specifically, the MAPS™ service made available by the assignee of the present application provides data integration capabilities so that insurers can download inspection data on-line and establish computer-to-computer data interfaces. Through such interfaces, an insurer analyzes the inspection data using database tools that support, for example, searching and sorting operations. In some cases, the inspection data has also been organized via a number of categories predetermined by the insurer. More specifically, such organization results in the placement of each inspected property (or the associated inspection report) in a category, or stack, according to criteria set by the insurer. For example, each policy renewal subject to a major condition (e.g., a rotting roof) may be placed in a separate category dedicated to those policy renewals requiring a letter to be sent to the insured to identify the repairs or corrections needed for renewal. While some rules previously set by the insurer have defined one or more categories based on an action to be taken by the insurer, other rules have been set to target a number of specific issues, such as the replacement cost estimate deviating from the policy coverage by more than 5%.

In either case, however, such inspection reporting services provide limited to no cumulative analysis of the inspection data and information. That is, the presence or absence of various issues, a simple binary decision repeated over all of the property characteristics, merely results in a number of flags for each property. The categorization or organization of each property into stacks based on any one of those flags fails to consider the cumulative effect of them all. Such limited analysis therefore leaves a considerable amount of risk assessment analysis to a non-automated, or manual, assessment of the inspection data at the insurer, which may lead to inconsistent or incorrect underwriting referrals or other incorrect insurance coverage determinations. Moreover, as insurers consider a greater number of characteristics in these determinations, the assessment of the cumulative effect of multiple flags, i.e., issues uncovered by the inspection, will be increasingly driven by subjective judgment calls prone to error and inconsistencies.

One method for overcoming the shortcomings of manual inspection data assessment is described in U.S. patent application Ser. No. 11/287,649 entitled "Property Insurance Risk Assessment Processing System and Method" and hereby incorporated by reference herein. As described in the application, a method facilitates an insurance coverage determination for a property based on a plurality of characteristic elements relevant to the insurance coverage determination. The method includes (i) receiving property data indicative of attributes of the property for the plurality of characteristic elements, (ii) determining a property risk score for the property based on the property data, and (iii) supporting the insurance coverage determination with the property risk score.

As described above, the property inspection is an often time-consuming physical examination of the subject property. While third parties may be employed to conduct the physical inspection, and a physical inspection may provide a detailed analysis of the property to assist in the underwriting decision process, the time and cost of the physical inspection are typically necessary regardless of the final decision. In other words, the physical inspection may be a significant sunk cost that is often completed for every application before a final decision can be reached to move forward with the underwriting process.

In addition to property characteristics gathered by inspection, and as also previously described in U.S. patent application Ser. No. 11/287,649, the applicant's personal credit score was used as the measurement of risk contributed by the applicant. However, privacy concerns, frequent inaccuracies in the credit reporting process, and the difficulty in correcting those inaccuracies often make an applicant's credit score an illegal, unfair, or imprecise measurement of the applicant's true contribution of risk to the policy for the insurer.

SUMMARY

A pre-screening or application risk assessment score may be calculated based on data accumulated during an insurance application process to more effectively segment risks at the point of application. The application data may be used as a substitute for, or in addition to, the applicant's credit score as an accurate measure of risk on the policy. In general, this pre-screening risk assessment score may be particularly useful for segmenting risks during the application and underwriting process for insurance policies that cover high-value items that typically require a measurement of risks contributed by both the property to be insured and the applicant before the policy can be written. More specifically, the score may be used in connection with the underwriting process for home and real property insurance policies. In accordance with one aspect of the disclosure, a method is useful for segmenting risks associated with an insurance coverage determination for property that typically requires a physical inspection, for example, real property. In some embodiments, the method may determine a score based on one or more of a plurality of applicant characteristics, demographic characteristics, property characteristics, or any other characteristics that are able to be gathered during the application process that provide a measure of risk for one or more of the policy and the prospective policyholder. These characteristics may be one or more elements that are input by an applicant for property insurance during an online, in person, or other type of application process, may be related to physical characteristics of the property, and may or may not be a subset of the data available or gathered during a physical inspection of the property itself. In other embodiments, the characteristics may be first received by a processing system and may be later verified by a physical inspection of the subject property.

Some embodiments described herein may include (i) receiving insurance application data indicative of key attributes of the property that allow segmentation of policy risks at the point of application. The application data may include one or more of applicant characteristics, demographic characteristics, and property characteristics, as described herein. The property characteristics may be easily known or accessed by the applicant to facilitate the segmentation of risks at the point of application, rather than required to be verified by later physical inspection. The data may also be a subset of the plurality of characteristic elements normally gathered during a physical inspection of the property. The method may also include: (ii) determining a pre-screening risk assessment score for the property based on the application data, and (iii) supporting an insurance coverage determination with the property risk score.

BRIEF DESCRIPTION OF THE DRAWING FIGURES

FIG. 3 is an interface display generated by the system of FIG. 1 to present insurance coverage determination output information where physical inspection data is used to verify a pre-screening risk assessment score;

Figure 1:
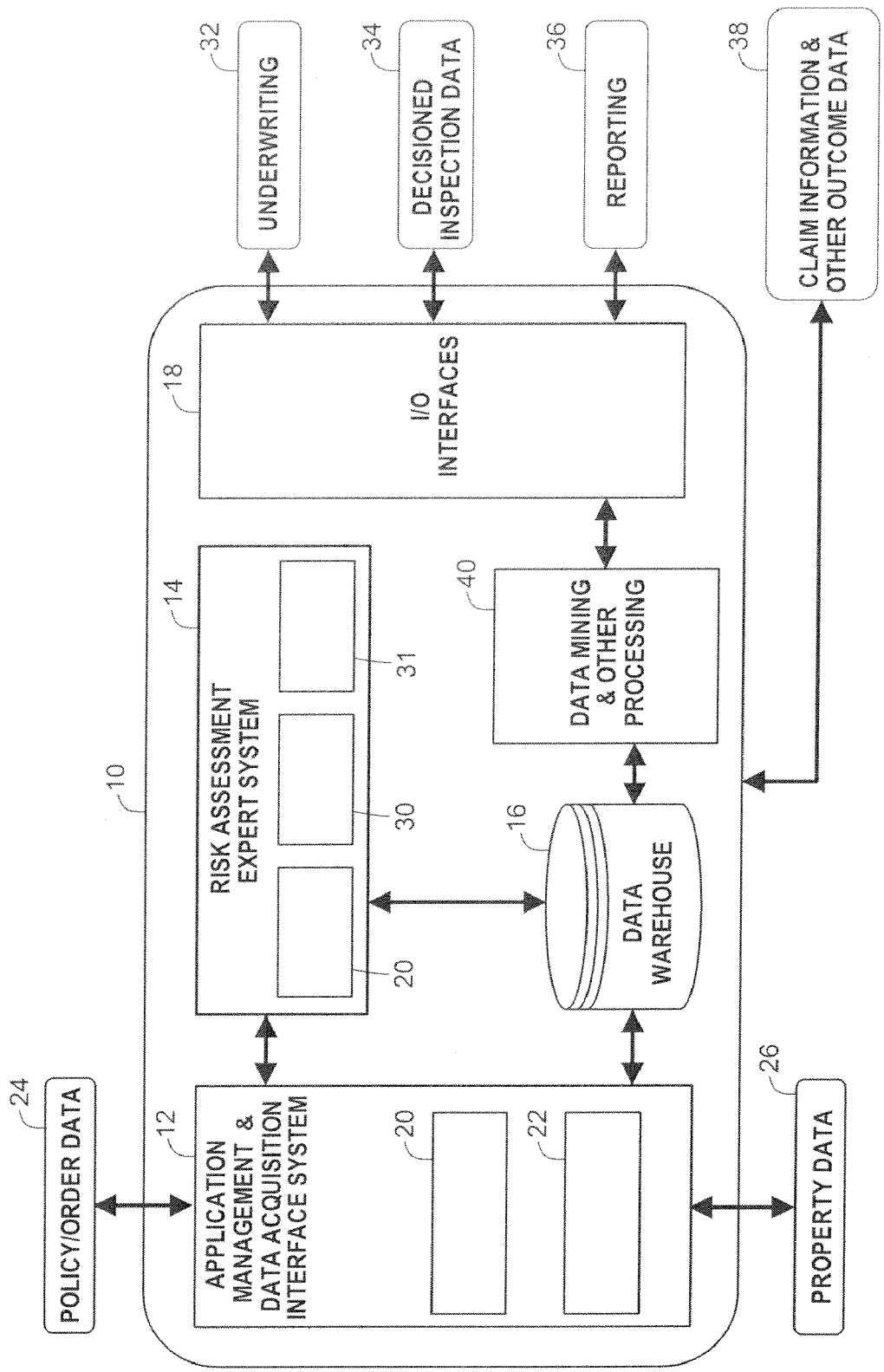
FIG. 1 is a schematic diagram of a system for processing property insurance application data to facilitate segmentation of risks for an insurance coverage determination at the point of application in accordance with one aspect of the disclosure.
Figure 4:
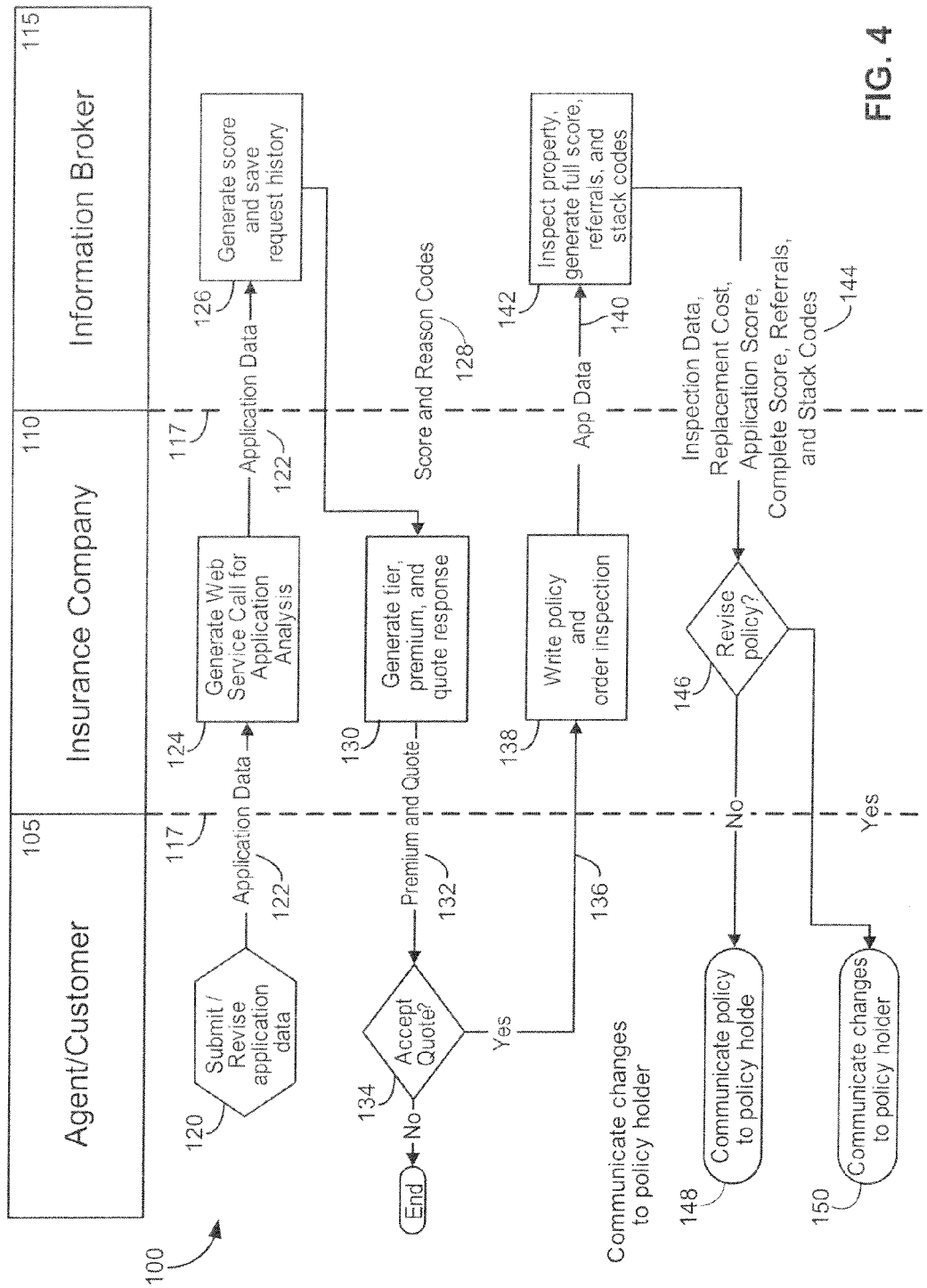

FIG. 4 is a schematic diagram depicting a method of processing property insurance application data in accordance with another aspect of the disclosure to segment risks associated with insurance coverage at the point of application, and which may be implemented by the system of FIG. 1 in accordance with one embodiment; and FIG. 5 is an output report generated by the system of FIG. 1 to present insurance coverage determination output information in accordance with an embodiment.

While the disclosed system and method are susceptible of embodiments in various forms, there are illustrated in the drawing figures (and will hereafter be described) specific embodiments of the invention, with the understanding that the disclosure is intended to be illustrative, and is not intended to limit the invention to the specific embodiments described and illustrated herein. For example, while the embodiments are described below with specific reference to an application process that may be used to segment risks and determine insurance coverage for homes and other improvements to real property, the embodiments may be applied to any other process involving segmentation of risks associated with an insurance policy where potential risk characteristics that may be attributed to the applicant other than the person's credit score or credit report are wholly or partially used.

DETAILED DESCRIPTION OF PREFERRED EMBODIMENTS

The disclosed system and method are generally related to helping insurers make more consistent insurance coverage determinations and decisions. As described below, such determinations may generally include decisions related to, for example, insurability, the need for underwriting, and policy pricing. The insurance coverage determinations are facilitated via an objective assessment of risk based on a number of factors. In some embodiments, these factors include property characteristics, personal characteristics of the applicant in addition to or other than a credit score, demographic characteristics, etc. The underlying details for the property characteristics may be verified via a property inspection after an applicant completes the application process. Other characteristics may be verified or measured with a degree of confidence during the application process that may assess risk without necessarily having to later complete a physical inspection of the property. Generally speaking, the risk assessment incorporates analysis of application and property data and other information relevant to the coverage determination. In this way, the disclosed method and system may provide a cumulative or aggregate assessment of the risk. More specifically, the risk assessment may provide an objective evaluation of the physical characteristics of a property (i.e., a house or other improvements to real property) that are able to be given by an applicant during an application process (and that are not necessarily a subset of the data available or gathered during a physical inspection) via the calculation of a risk score or index for the property or policy. The risk assessment score or index may also be supplemented by the applicant's personal data, inspection data, and other relevant information.

While the disclosed system and method relies on the calculation of a risk score to facilitate consistent and accurate insurance coverage determinations, practice of the disclosed system and method is not limited to any one particular algorithm or algorithm type for computation of the risk score. Instead, and as further described below, any number of different formulas, computation routines or other algorithms may be utilized to aggregate the data and other information relevant to the insurance coverage determination. Similarly, practice of the disclosed technique is not limited to any particular property, applicant, or demographic characteristics or attributes, and any set thereof may be relied upon given the specific application or context. Thus, the manner in which the effects of various property attributes are quantified, accumulated or otherwise represented in the calculation of the risk score may be adjusted or configured, as desired, for different situations, contexts, customer groups, geographic areas, property types (e.g., commercial vs. residential), and other desired factors.

The disclosed technique is suited for use or application in connection with a broad range of insurance coverage determination contexts. The disclosed technique may be applied in connection with any property type, geographic area, etc., and is not limited to residential or other property types that may be more typically subjected to inspection, underwriting, or other analysis during the insurance coverage determination process. As a result, practice of the disclosed method and system is not limited to the homeowner's insurance context or the property inspection context, but rather is well suited for any context in which property or other relevant data and information has been collected or otherwise received for a plurality of characteristics related to a property, property insurance policy, or policy application, and where the nature and/or effect of such data and information in the aggregate may be quantified for aggregation or other processing.

The manner in which the disclosed risk assessment technique provides a scoring or indexing mechanism predictive or otherwise indicative of the propensity of the risk at the front end (e.g., during the application process) of an insurance determination is now described in connection with a number of embodiments. In accordance with another aspect of the disclosure, the manner in which the disclosed risk assessment technique is utilized at the back end of the insurance determination process is also described. Specifically, the disclosed technique may be utilized in combination with a database having the property risk score and other property attributes. Whether used at the front end or back end of the coverage determination, the embodiments described below may facilitate the insurer's use of property, applicant, demographic and other data that may be accumulated during an application for insurance coverage in any number of different insurance coverage decisions and other determinations.

With reference now to FIG. 1, an insurance application data processing system 10 includes an application management and data acquisition interface system 12, a risk assessment expert system 14, a data warehouse 16, and any number of input/output (I/O) interfaces 18. These and other components of the system 10 may be integrated or distributed in any desired fashion, and are shown as separate systems (or subsystems) for convenience in illustration only. For instance, both the systems 12 and 14, the data warehouse 16, and the I/O interface(s) 18 may be implemented on a single server or other computer having conventional processing, data storage and I/O interface capabilities. Furthermore, each of the systems 12 and 14 need not be integrated as shown, but rather may be implemented by more than one server or computer in any networked or otherwise distributed fashion.

The system 12 generally provides functionality related to the capturing, gathering, and processing of application data. To that end, the system 12 may include a dedicated processor 20 and memory 22 for implementing one or more software modules or routines that control the routing or other processing of property insurance application data, to control the receipt of the application data and other information resulting therefrom, and any initial processing to prepare such data for analysis, and to analyze the data according to any of the methods or routines described herein. Accordingly, the system 12 may also have I/O capabilities (not shown) for interfacing via any desired communication mechanism, protocol, etc. with other systems 24, 26 from which application data, property characteristics, policy data, inspection data, or other data may be sent or acquired. In some embodiments, the I/O interface(s) 18 may be utilized to any desired extent to support such communications.

More generally, the system 12 implements an input routine to receive or collect the application and any other relevant data for each property (or policy). In some cases, the input routine may be stored in the memory 22 and adapted for implementation by the processor 20. In some embodiments, the input routine (and any other routines implemented by the system 12) may be integrated to any desired extent as a part of a database management application implemented by a database server. Further, the processors 20 and memory 16, 22, 30 facilitate executing any of the methods and routines described herein. For example, any of the memory 16, 22, 30 may be described as a computer-readable medium, and the methods stored therein, the methods and routines including instructions that may be executed by the processor 20 of any of the computers or systems described herein. Generally, a computer-readable medium may include semiconductor memories, magnetically readable memories, and/or optically readable memories. For example, the methods may be executed by the system 10 from one or more computer-readable-memories including a USB Drive, a hard or floppy disk, CD, or DVD.

In one embodiment, the management of property insurance application data, and the acquisition of application data provided by the application management and data acquisition interface system 12 is implemented with software modules developed with standard Microsoft development tools and deployed in a windows-based environment with a commercially available and scalable database management system, such as Oracle or Microsoft SQL Server. In this way, the interface system 12 provides a relational database for the management of the data associated with application data. Any hardware suitable for such database systems and modules may be utilized.

Generally speaking, the application data may be sent and received in any desired format or form. Practice of the disclosed technique is not limited, therefore, to any type of application data. Accordingly, as used herein, the terms "property insurance application data," "inspection data," "property data," and "property characteristics" are used in a broad sense to include any information or data gathered in connection with, derived from, or otherwise acquired as a result of, a property insurance application or policy, regardless of the format, form, content or source of the information or data.

Generally speaking, the application or property data specify attributes of the property or aspects related thereto (e.g., the attributes of the policy, policyholder, owner, occupants, and/or applicant) for a number of characteristic elements of, or relevant to, the insurance coverage determination. Characteristic elements may include or be directed to, without limitation, any dwelling feature characteristics, dwelling condition characteristics, liability concern characteristics, and surrounding area characteristics. For example, one or more of the characteristic elements may be directed to the type and condition of the roof. In that case, two of the corresponding attributes for a particular property may then specify that the dwelling on the property has (i) a shingled roof (ii) in good condition. The property characteristics provided to the system 12 during an application process may reflect those attributes in any desired fashion (e.g., via alphanumeric text, numerical codes, assigned data values, etc.). The system 12 may then process the incoming data from the systems 24, 26 to place such property data in a format suitable for further processing by the system 10.

In some embodiments, the insurer may elect (or be legally permitted) to consider the liability concern characteristics of the owner(s), occupant(s) or applicant(s) associated with the policy application or policy. In such cases, the applicant may provide additional information that may indicate an amount of risk personally contributed by the applicant. The additional information may include providing authorization to access a credit score or other owner risk characteristic from a third party (i.e., Experian™, Trans Union®, etc.). To that end, the system 12 may communicate or otherwise interface with one or more systems (not shown) to gather such data.

In other embodiments, the insurer may not be legally permitted to consider the liability concern characteristics of the applicant and may not be permitted to access third party information about the applicant without the applicant's explicit consent or may simply be unable (legally or otherwise) to access any third party information about the applicant. In such cases, the applicant may provide further information related to the property or the applicant (e.g., property characteristics, other personal information such as loss history for the individual and/or the property, demographic information, etc.). This information may be used by the system 10 as a substitute for, or in addition to a credit score as a measure of risk on the policy.

Once the application data has been received, such data may be stored in the data warehouse 16 and associated with the property (or policy) for future reporting and other uses. The data warehouse may include one or more databases or data structures of any desired configuration. The data warehouse 16 may also include one or more processors (not shown) implementing any desired database software (e.g., Oracle, SQL Server) for managing the data storage function. In one exemplary embodiment, the functionality provided by the data warehouse 16 is handled by an Oracle database server running in a Microsoft Server 2000 environment similar to the exemplary embodiment described above in connection with the interface system 12. In fact, this Oracle database server may, but need not, correspond with, or include, the database applications and systems provided for the interface system 12. Alternatively, the databases may run separately but on the same hardware.

The application data is also provided by the system 12 or the data warehouse 16 to the risk assessment expert system 14 for processing in accordance with the disclosed technique. As with the system 12, the risk assessment expert system 14 may be implemented via any desired configuration of hardware and software, but generally may include one or more processors 28 and one or more memories 30 dedicated thereto. As described in greater detail below, the system 14 processes the application and property data to determine a property risk score (e.g., index) for the property. In some embodiments, the risk assessment expert system includes a property insurance application data risk assessment module 31 that determines a pre-screening risk assessment score using data that is collected during an application for property insurance as described herein, rather than, or in addition to, physical inspection data. The property insurance application data risk assessment module 31 is further described below. Generally speaking, the calculation, computation or other determination of the pre-screening risk assessment score provides a collective or cumulative assessment of the property in the sense that property data indicative of the attributes for a number of characteristic elements are processed to arrive at the score. The risk score then represents the combined effects of all the attributes. In this way, the risk score may be considered an index, but should not be limited to any particular computation algorithm or scheme. For instance, the risk score may, but need not, provide an indexed view of the property attributes via weighted contributions to a summed total. In such cases, the contributions, the weights, and the summing algorithm may be configured in any desired manner, and may be customized for the context (e.g., property type) to which the risk score is being applied.

More generally, the calculation, computation or other determination of the risk score based on the application data may utilize any algorithm or algorithm type. For instance, the weighted-sum score or index described above may be combined or replaced with other statistical analytics, such as a behavior probability model. In such models, the score may quantify the probability that the owner(s), applicant(s) and/or occupant(s) are likely to utilize and/or maintain the property in a manner unlikely (or, conversely, likely) to result in a claim. For example, if the components of the house are more valuable than the value of the house itself, one may consider that an indication of a higher claim probability. Conversely, if the replacement cost of the property is less than the market value, then the owner would presumably take steps to maintain and protect the property, leading to a lower claim probability.

In some embodiments, the risk score is stored in the data warehouse 16 in association with the property data from which it was determined. In this way, the risk score may become a component of a comprehensive report provided to the insurer regarding the property. As a result, and as described in greater detail below, the report provides both the raw inspection data and other relevant information for the policy application or renewal, but also an objective analysis thereof to support consistent and accurate decision-making by the insurer. The risk score thereby facilitates the proper disposition of policy applications and renewals, and any intermediate or other insurance coverage determinations related thereto (e.g., underwriting referrals).

More generally, the storage and/or transmission of the risk score may be handled by an output routine implemented by any one or more of the processors noted above (e.g., the processor 28 of the system 14). To that end, the output routine may be stored in any one or more of the memories associated or in communication with such processor(s), and/or be integrated as a part of the above-described database management application(s). As described immediately above, the output routine may store the risk score in the data warehouse 16 or in any other database. Alternatively or additionally, the output routine may provide the risk score to the insurer or some other database or memory in communication with the system 10. To that end, the output routine may be implemented as a part of the I/O interface(s) 18.

With continued reference to FIG. 1, the manner in which the insurance coverage determinations are supported is shown generally via interaction between the system 10 and various systems having functionality that may, but need not, be provided by the insurer. Specifically, in the exemplary embodiment shown, the system 10 may provide an underwriting referral to a system 32 directed to processing the referrals. The communication may be (but need not) bi-directional, in the sense that the system 32 may provide information or data back to the system 10 to indicate the status or results of the underwriting analysis.

In some embodiments, an additional system 34 may communicate with the system 10 to relay information or data indicative of the insurance coverage determination supported by the risk assessment processing (e.g., the risk score) of the disclosed technique. In some cases, however, the underwriting system 32 and the system 34 constitute the same system, and may serve as the main interface with the insurer. In any case, the system 34 (or 32) may receive the property data (including the risk score) in association with information indicating whether a certain action should be (or has been) taken as a result of the risk assessment.

Any number of actions may be taken that, generally speaking, involve a disposition of the policy application or renewal. Exemplary dispositions include whether a policy will be made available or renewed, and in the event of an affirmative outcome, a pricing tier decision. Each of these determinations, or disposition decisions, may be represented by a stack or category dedicated thereto, and assigned to the property or policy after the risk score and other property data is determined, as described below.

Information regarding the outcome of the disposition may flow back to the system 10 as well. Assume, for example, that the insurer has predetermined that coverage will be denied if the risk score falls below a threshold or level. When the requisite level is not met, the system 10 may notify the system 34 (or other component or system of the insurer) that a denial notification letter or other message including such information should be sent to the applicant or policyholder. Once the letter is sent, an indication of its delivery may be returned to the system 10 for storage in the data warehouse 16. In this way, a comprehensive record of the property inspection process is maintained by the system 10.

Other outcome information that may flow back to the system 10 includes information or data reflective of insurance claims made in connection with the property or policy.

In many cases, the insurer maintains its own records of the application process. The records may be utilized during the underwriting process or at any other point before, during or after the disposition of the policy application or renewal. In any event, the system 10 may generally provide one or more reports to support the insurance coverage determination. As shown and described below in connection with FIG. 4, the report may include a summary of the application along with the property risk score. Therefore, in some embodiments, the insurer (or other entity) may have a system 36 directed to utilizing and/or storing the reports as a part of the insurance coverage determination process. Alternatively or additionally, the insurer may have a system 38 dedicated to storing information and data indicative of the results or outcomes of the application process. Reports generated by the system 10 may, but need not, be handled separately.

The reports may be customized in accordance with any desired factor and may, for example, be generated as a result of a request sent by the system 36. In such cases, the system 36 may specify the desired nature, format or other aspect of the report. For instance, the system 36 may specify one or more parameters or other factors identifying a group of policies or properties to be included in a report. Upon receipt of the request, the system 10 may then direct a database management application or module 40 to implement data mining and other processing to retrieve the requested information from the data warehouse 16. The report itself may be generated by the application 40 or any other software resident in any of the components of the system 10. In some cases, the functionality provided by the database application 40 may be implemented by, or incorporated or integrated in, one of the other components of the system 10.

Alternatively, some of the functionality implemented by the systems 32, 34, 36 and 38 may be provided by the system 10, as desired. In some cases, the functionality may be provided in an automated fashion given rule sets established previously by the insurer. For instance, the underwriting referral and other control or management of the underwriting process may be initiated or otherwise managed by the system 10. In such cases, one or more predetermined triggers may be established. But rather than having to rely on individual elements of the application data and property characteristics, practice of the disclosed technique enables the triggers to utilize, include or incorporate the collective or cumulative risk assessment provided by the risk score.

Alternatively or additionally, the initiation of any actions necessary to address a condition for policy renewal or a condition of the application process may be handled in automated fashion by the system 10. Similarly, the generation of reports may be automatic based on predetermined criteria, rule sets or any other factor, including the mere generation of the risk score itself.

Regardless of whether the insurer has delegated the management or implementation of underwriting referrals or report generation, the communication of data between the systems 32, 34, 36, and 38 and the system 10 may be automated such that the data warehouse 16 is automatically updated to reflect the results of an underwriting referral or other outcome of the policy disposition, such as a pricing tier decision. As shown in connection with the system 38, such communication is not necessarily limited to the application process or, for that matter, the activities directly related to the policy disposition. Rather, information or data indicative of future events, such as claims information or any other events affecting the profitability of the policy, may be provided, stored or otherwise associated with the property data and/or the risk score. Claims information and other outcome data may then be used to evaluate the performance of various stages in the application process, including, for instance, underwriting and the risk score (or the algorithm leading thereto).

Figure 2:
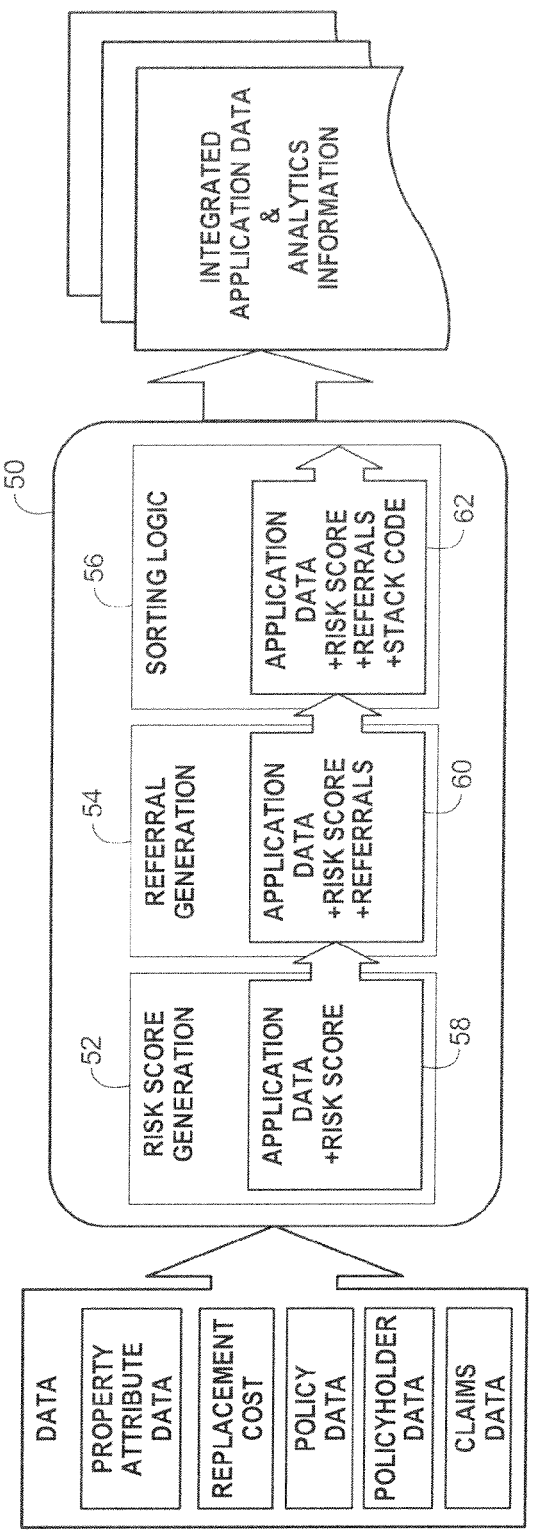
FIG. 2 is a schematic diagram depicting a method of processing application data in accordance with another aspect of the disclosure, and which may be implemented by the system of FIG. 1 in accordance with one embodiment.

With reference now to FIG. 2, further details are provided regarding the processing and other routines in accordance with an exemplary embodiment that may, but need not, be implemented using the system 10 (FIG. 1) and other elements described in connection therewith. That is, FIG. 2 shows the data flow and processing implemented in accordance with those embodiments of the disclosure implemented largely or entirely via software executed by one or more general-purpose processors. Such software may, but need not, be implemented as (or in connection with) integrated modules or other portions of a database management software module or application suite. Notwithstanding the foregoing, the functionality shown in FIG. 2 may be implemented via the processors and other components described above in connection with FIG. 1 executing one or more software modules, or other computer programs or methods.

In the exemplary embodiment of FIG. 2, the generation of the risk score, the generation of any underwriting or other referrals, and the execution of any sorting or other organizational routines, are generally implemented via the execution of a routine (or application) 50, which may be a processing routine including computer-executable instructions that are integrated or in communication with the above-described database management application(s). The routine 50, in turn, includes a number of modules configured to implement one or more sub-routines dedicated to specific data generation functions. Specifically, a risk score generation routine 52, a referral generation routine 54, and a stack code generation (or sorting logic) routine 56 may be implemented automatically or conditionally in response to the nature of the incoming property data, as described below. For convenience in illustration, the routines 52, 54 and 56 are depicted along with blocks 58, 60, and 62, respectively representative of the dataflow through the implementation of the block 50. As the data and information from the application is processed by the block 50, the data is associated or integrated with a risk score. Additionally or alternatively, the risk score may be associated with one or more underwriting referrals and one or more stack or other organizational codes (as described below). In this way, the application data may be processed to include additional data and information to facilitate the insurance coverage determination that can be used as a substitute for, or in addition to an applicant's credit score as a measure of risk on the policy.

In some embodiments, application and property characteristic data may include policy attribute data, replacement cost estimates, policy information or data, policyholder (i.e., owner) data, and claims data. As described above, some of the data may be provided after the application process has resulted in determination of a score, such as information regarding a subsequent claim. Such data may be incorporated into the risk score calculation, as desired. Accordingly, the risk score for a particular property may be updated to reflect changes to the property or other factors that may influence further decisions in the future.

The results of the implementation of the routine 50 may include integrated application data and analytics information, as shown in FIG. 2. The nature of the integration may reflect the content of a report and/or the nature of the database in which the integrated data and information is stored. In either case, the integrated nature of the data assists the insurer in its analysis or handling of the results of a future property inspection, if needed after the application process.

The generation of stack codes via the routine 56 may rely on the risk score determined by the routine 52. That is, rather than rely on sorting logic that looks at one or two of the property attributes individually to determine whether the policy falls in various stacks or categories, the insurer may utilize the risk score to organize or sort the policies into stacks that take into account the cumulative effect of all of the property attributes. In any event, the generation of the stack codes may utilize a predetermined, multiple-factor rule set that establishes the plurality of stacks, or categories, in accordance with the insurer's preferences.

Referring now to FIG. 3, the output routine, database management application, or any module or other portion thereof may be configured to generate one or more client access interface display screens in some embodiments that may include inspection data in a later verification of a risk score. Utilization of inspection data is described in U.S. patent application Ser. No. 11/287,649, as previously incorporated by reference. While the client access display screen 70 is generally described in relation to inspection data, the below description may be applied equally to application data and property characteristics, as described herein.

An exemplary client access display screen 70 provides an inspection status panel 72, a command or menu panel 74, and a sort function panel 76. Generally speaking, the interface(s) provided by display screens like the exemplary screen 70 allows an insurer to review the results and related referrals, stack logic code and risk score for inspections completed during defined time periods. In this case, the status panel 72 provides a listing of inspection results that present data specific to each of the inspections and related policies. The list may be sorted using the sort function panel 76 by any number (e.g., up to three) of the property characteristics identified in the column headers. Specifically, the sort function panel 76 provides a number of drop-down menus with corresponding check or selection boxes to configure the sorting routine. The display screen 70 may also support further access and display of inspection or property data by allowing the insurer to select a specific policy or property via, e.g., a mouse-click selection anywhere within the specific row. In that event, a further display screen (not shown) may be generated to allow the insurer to view the detailed inspection results and any other data not necessarily displayed via the characteristics shown in the display screen 70.

As part of the property data made available to the insurer, the risk score is displayed for each policy or property (in this case, the column farthest to the right). The stack codes may also have one or more dedicated columns.

The display screen 70 generally allows the underwriters to sort inspection results, typically by one or more of the stack codes, to support identifying specific inspections requiring further review for disposition. That is, the underwriters will identify those inspections having referrals and specific conditions of the property, thereby requiring the judgment of an underwriter for disposition. Inspections codified with acceptable stack codes need not be reviewed by underwriters and, thus, the utilization of the stack codes allows underwriters to review only a fraction of all inspections performed.

The display screen 70 and any display screens accessible therefrom may also allow the underwriters to apply a disposition code to the inspections. Examples of such codes may include, but are not limited to, "Issue-Renew", "Issue Condition Letter", and "Cancel-Do Not Renew." In this exemplary case, the display screen 70 includes a "Disp. Code" column. These disposition codes are then integrated back into the policy underwriting systems to effect the defined disposition, and may also be stored in the data warehouse 16 or other memory associated with the system 10.

Menu items in the panel 74 generally provide users access to other functionality and reporting such as the manual ordering of inspections, reports for monitoring inspection and quality review throughput and timeliness, and other administrative tasks.

With reference to FIG. 4, a system and method 100 may utilize application data acquired by the data acquisition interface system 12 (FIG. 1) and the property insurance application data risk assessment module 31 to determine a pre-screening risk assessment score using data that is collected during an application for property insurance. In some embodiments, the system and method 100 is incorporated into any of the systems, methods, and modules described above. The system may include one or more levels 105, 110, 115 that represent different entities involved in determining a pre-screening risk assessment score. Each of the entities may be physically or logically separate and may communicate though one or more interfaces 117, for example, a Web interface or other computer-implemented interface that facilitates the communication of application and other data between the various entities. Each entity may include one or more servers or other computing devices to facilitate storing, communicating, receiving, and processing the application and other data between the entities. In some embodiments, the entities include an agent or customer 105, an insurance company 110, and an information broker 115 that each communicate data over the Internet using one or more Web interfaces 117.

At block 120, a customer, agent, or other user may enter data related to a property insurance application into a physical or online form. For example, the agent or customer may access a Web page that guides the entity 105 through an automated application process. The application process may include questions, an online form, or other technique to gather property characteristics and application data 122 from the agent or customer. In some embodiments, the application data 122 may include any data describes a physical characteristic of the property and that is able to be entered by an applicant for property insurance during the application process. In other embodiments, the application data 122 includes any data that would normally be collected during a physical inspection of a property to include characteristics of the subject property. In still other embodiments, the application data 122 includes a sub-set of the characteristic elements, as previously described, that would normally be collected during the application process, the sub-set including those characteristic elements that are most predictive of future loss ratios relative to other applicants, companies, properties, historical data, and other factors. For example, the application data may include or be directed to, without limitation, any dwelling feature characteristics, dwelling condition characteristics, liability concern characteristics, and surrounding area characteristics. Further, the application data 122 may include as much data as may possibly be collected from an online applicant, where the data is capable of being verified though a physical inspection of the property during a full evaluation and review of the policy quote and the data 122 may be used by the system 100 as a substitute for, or in addition to, a credit report or score of the applicant as a measurement of risk on the policy. Regardless of the application data content, each pre-screening risk assessment score may be determined with a set of data that includes the same characteristics for each customer or applicant to facilitate accurate comparison of the scores and segmentation of property risks. The application data 122 may be communicated to and received by a second entity 110, an insurance company, for example. In some embodiments, the agent or customer 105 sends the application data 122 through a Web interface 117 to a server at the insurance company in a typical client/server transaction.

At block 124, the insurance company 110 may generate a service call to another entity 115 or to a local or remote entity or software application to begin analysis of the application data gathered at block 120. In some embodiments, the insurance company 124 communicates the application data 122 from one or more servers through a Web interface 117 to a third entity, for example, an information broker 115. For example, upon receiving the application data 122 at the insurance company 110, the data may be reviewed for completeness and for errors before or after the method 100 generates a service call to analyze the application data 122 at block 124. A copy of the received data 122 may also be stored at the insurance company 110 for future reference.

At block 126, the information broker 115 may generate a pre-screening risk assessment score and save the received application data 122 and generated score for future reference. In some embodiments, the method 100 may generate the score by applying the processes described above in relation to FIGS. 1 and 2. Because the application data 122 includes data other than a complete set of inspection data as described in relation to FIGS. 1 and 2, the method 100 may utilize the previously-described processes using a smaller number of characteristics or a completely different set of characteristics than are used to generate a complete risk assessment score. In some embodiments, characteristics included in the application data 122 are weighted according to a degree to which the property historically affects the risk assessment score. For example, a roof type may affect the risk score to a greater degree than a water source (e.g., city or well), and may be weighted more heavily. The pre-screening risk assessment score may also include one or more reason codes associated with the score that provide an indication of what application data 122 or other factors included in the score generation of block 126 may have positively or negatively impacted the pre-screening risk assessment score. The information broker 115 may communicate the score and reason codes 128 to the insurance company 110 through the Web interface 117.

At block 130, the insurance company 110 may generate tier, premium, and quote information from the received score and reason codes sent by the information broker. In some embodiments, the tier, premium, and quote information are generated according to the process described in relation to FIG. 2, above. In other embodiments, the insurance company 110 categorizes the received scores according to various risk levels. For example, the insurance company 110 may categorize the scores into various tiers or stacks according to a stack code generation (or sorting logic) routine 56 (FIG. 2) as previously described. From the stacks, the insurance company 110 may assign a premium for one or more coverage policies for each applicant, for example, with varying coverage, deductibles, durations, etc. The insurance company may also generate a quote including an explanation of the premium, the pre-screening risk assessment score, and various other factors that determined the premium and other information. The insurance company may also store the premium and quote information 132 and communicate the information 132 to the agent or customer 105 through the Web interface 117.

At block 134, the agent or customer 105 may evaluate the premium and quote information 132 to determine whether or not to accept the quote. If the agent or customer does not accept the quote, the method 100 may end. If the agent or customer accepts the quote, then the acceptance 136 may be communicated to the insurance company 110 through the Web interface 117.

At block 138, the insurance company 110 may receive the acceptance 136 and begin more formal policy writing procedures. The insurance company 110 may write the policy according to the premium and quote information 132, and order a complete inspection of the property. In some embodiments, the inspection ordered at block 138 verifies some or all of the information included in the application data 122 without collecting any further data. In other embodiments, the inspection includes the characteristic elements of a complete physical inspection of the property to supplement or replace the application data 122 collected at block 120. The policy and inspection data 140 may also be sent to the information broker 115 through the Web interface 117.

At block 142, the information broker may utilize the inspection data to generate a complete property risk assessment score following the processes discussed above in relation to FIGS. 1-4 and in U.S. patent application Ser. No. 11/287,649 and may include generating referrals and stack codes as also discussed herein. The information broker 115 may then send the updated data 144 to the insurance company 110 through the Web interface 117. In some embodiments, the updated data includes inspection data, replacement cost data, the pre-screening or application risk assessment score, the complete risk assessment score, referrals, and stack codes.

At block 146, the insurance company may evaluate the updated data 144 and decide whether or not to revise the policy written at block 138. In some embodiments, policy revision is recommended when results of the complete inspection reveal that the application data 122 used to generate the original quote and pre-screening risk assessment score cannot be confirmed through the physical inspection, or was incorrectly reported by the agent or customer. If no revision is necessary, then the insurance company 110 may communicate the final policy to the applicant at block 148. If revision is necessary, then the insurance company 110 may communicate to the applicant the changes to the policy (block 150).

FIG. 5 depicts a property report generated in accordance with one embodiment of the disclosed system and method. The report may be generated on-line for display via, e.g., an interface display screen, or otherwise transmitted to a user. Alternatively or additionally, the report may be ordered or otherwise requested via such interfaces for delivery in hardcopy form. In any case, the exemplary report includes sections dedicated to summarizing the salient portions of one or more of the application process, the property inspection, the calculation of a replacement cost, and the calculation of the risk score and/or pre-screening risk assessment score. The risk score and/or pre-screening risk assessment score may be shown by a single quantity, but this need not be the case. That is, the score(s) may be quantified with multiple values, each of which may, for instance, be dedicated to certain portions of the analysis or the application process. The score section of the report may also show one or more factors that influenced the risk score value. Lastly, the report may include a section listing the underwriting referrals that were generated as a result of the score, a listing of potential insurance companies that would accept an applicant with a pre-screening risk assessment score similar to the score associated with the applicant, and other property data. Both the display screen 70 (FIG. 3) and the property report of FIG. 5 may be generated by the above-described output routine or method implemented by or associated with the system 14, data warehouse 16, or the I/O interface 18, such as a database management module.

As described above, the determination of a pre-screening risk assessment score or a complete risk assessment score or index that aggregates the effects of a number of property characteristics, whether based on data provided during an application process or inspection data, improves the risk assessment and other aspects of insurance coverage decisions and other determinations. To that end, the score may be utilized to sort and identify policies or groups thereof, may be utilized to define stacks or categories of such policies, or may be used directly in policy disposition logic (i.e., rule sets) by the insurer. In these ways, the insurer increases the consistency and accuracy of its coverage determinations and actions to support better risk assessment in property insurance policies. In these ways, the numerical nature of the score objectively correlates the property attributes that may have, for instance, been identified as risk characteristics and maintenance behavior in an application for property insurance, or, if needed, an inspection report, with loss ratio performance.

Embodiments of the disclosed system and method may be implemented in hardware, software, firmware, or any combination thereof. Some embodiments may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has one or more processors, such as, for example, a general-purpose processor, a CPU, a digital signal processor (DSP), a microcontroller, an application specific integrated circuit (ASIC), or a microprocessor.

The programs may be implemented in a high-level procedural or object oriented programming language to communicate with a processing system. The programs may also be implemented in assembly or machine language, if desired. In fact, practice of the disclosed system and method is not limited to any particular programming language. In any case, the language may be a compiled or interpreted language.

The programs may be stored on a storage media or device (e.g., floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the disclosed system and method may also be considered to be implemented as a machine-readable storage medium, configured for use with a processing system, where the storage medium so configured causes the processing system to operate in a specific and predefined manner to perform the functions described herein.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A tangible computer-readable storage medium including instructions stored thereon and adapted to be executed by a processor to implement a method comprising:
  receiving a plurality of application data sets at a computing device during the application process, each application data set corresponding to a different property and including physical characteristics of the corresponding property, wherein the application data is a substitute for a credit score as a measure of risk;
  determining a pre-screening risk assessment score for each property based on the application data received during the application process;

generating tier, premium, and quote information for an insurance policy based on the pre-screening risk assessment score;

verifying the application data by determining a complete property risk score for each property based on data received from a physical inspection of the property;

organizing the plurality of application data sets into stacks based on a comparison of the complete property risk score and a multiple-factor rule set, wherein the multiple-factor rule set includes an insurer preference for the disposition of the application process based on the complete property risk score and the comparison organizes the plurality of data sets into one of a first stack for denial or further review of the application process and a second stack for issue or renewal of the application process;

generating tier, premium, and quote information for a revised insurance policy based on the complete risk assessment score; and communicating at least one of the insurance policy or the revised insurance policy to a customer or agent.

2. The tangible computer-readable storage medium of claim 1, wherein verifying the application data further includes comparing the application data to the data received from the physical inspection.

3. The tangible computer-readable storage medium of claim 1, wherein verifying the application data further includes comparing the pre-screening risk assessment score to the complete property risk score.

4. The tangible computer-readable storage medium of claim 1, wherein the application data includes one or more of dwelling feature characteristics, dwelling condition characteristics, liability concern characteristics, and surrounding area characteristics.

5. A computer system comprising:

an application data acquisition interface system;

a risk assessment expert system including a property insurance application data risk assessment module;

a data warehouse storing a plurality of applications for property insurance, each application including application data;

one or more processors coupled to the application data acquisition interface system, the risk assessment expert system, and the data warehouse, and configured to execute instructions of the property insurance application data risk assessment module, wherein the instructions include:

receiving a plurality of application data sets from the application data acquisition interface system, each application data set corresponding to a different property and including property characteristics that are a substitute for a measure of risk contributed by an applicant for property insurance;

determining a pre-screening risk assessment score for each property based on the application data;

generating tier, premium, and quote information for an insurance policy based on the pre-screening risk assessment score;

verifying the application data by determining a complete property risk score for each property based on data received from a physical inspection of the property;

organizing the plurality of property data sets into stacks based on a comparison of the complete property risk score and a multiple-factor rule set, wherein the multiple-factor rule set includes an insurer preference for the disposition of the application process based on the complete property risk score and the comparison organizes the plurality of data sets into one of a first stack for denial or further review of the application process and a second stack for issue or renewal of the application process;

generating tier, premium, and quote information for a revised insurance policy based on the complete risk assessment score; and communicating at least one of the insurance policy or the revised insurance policy to a customer or agent.

6. The system of claim 5, wherein the risk assessment expert system causes the one or more processors to generate tier, premium, quote, and stack information based on the complete property risk score.

7. The system of claim 6, wherein the risk assessment expert system further causes the one or more processors to revise the insurance policy based on the pre-screening risk assessment score if the generated tier, premium, and quote information based on the complete property risk score differs from the generated tier, premium, and quote information based on the pre-screening risk assessment score.

8. The system of claim 6, wherein the property insurance application data risk assessment module further causes the one or more processors to verify the application data by comparing the pre-screening risk assessment score to the complete property risk score.

9. The system of claim 5, wherein the application data includes one or more of dwelling feature characteristics, dwelling condition characteristics, liability concern characteristics, and surrounding area characteristics.

* * * * *